US008523576B2

(12) United States Patent
Heien et al.

(10) Patent No.: US 8,523,576 B2
(45) Date of Patent: Sep. 3, 2013

(54) CONNECTOR FOR COUPLING AN ELECTRIC MOTOR TO A POWER SOURCE

(75) Inventors: Stephen G. Heien, Seal Beach, CA (US); Jimmy M. Chang, Rancho Palos Verdes, CA (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 13/280,082

(22) Filed: Oct. 24, 2011

(65) Prior Publication Data

US 2013/0099562 A1 Apr. 25, 2013

(51) Int. Cl.
*H01R 4/28* (2006.01)

(52) U.S. Cl.
USPC ........................................................... 439/34

(58) Field of Classification Search
USPC ..................... 439/34, 125, 890, 320; 310/71; 903/904, 915; 431/258
See application file for complete search history.

(56) References Cited

U.S. PATENT DOCUMENTS

| | | | | |
|---|---|---|---|---|
| 2,736,870 | A * | 2/1956 | De Jur et al. ................... | 439/152 |
| 2,879,495 | A | 3/1959 | Ingram | |
| 2,913,696 | A * | 11/1959 | Burgher ........................ | 439/126 |
| 4,266,841 | A * | 5/1981 | Sherwood ..................... | 439/312 |
| 4,316,304 | A | 2/1982 | Parise et al. | |
| 4,671,586 | A * | 6/1987 | DeBolt .......................... | 439/126 |
| 4,743,201 | A * | 5/1988 | Robinson et al. ................ | 439/10 |
| 4,950,171 | A * | 8/1990 | Muzslay ....................... | 439/76.1 |
| 5,011,417 | A | 4/1991 | Matsumoto et al. | |
| 5,491,370 | A | 2/1996 | Schneider et al. | |
| 5,513,905 | A * | 5/1996 | Zeides et al. ................ | 303/119.3 |
| 5,552,976 | A | 9/1996 | Munro et al. | |
| 5,716,223 | A * | 2/1998 | Phillips et al. ................ | 439/125 |
| 6,078,117 | A | 6/2000 | Perrin et al. | |
| 6,326,704 | B1 | 12/2001 | Breed et al. | |
| 6,538,902 | B1 | 3/2003 | Beard | |
| 6,773,312 | B2 | 8/2004 | Bauer et al. | |
| 7,001,195 | B2 * | 2/2006 | Fleetwood et al. ........... | 439/320 |
| 7,205,860 | B2 | 4/2007 | Axelrod et al. | |
| 7,316,592 | B2 * | 1/2008 | Chan et al. .................... | 439/824 |
| 7,438,587 | B2 * | 10/2008 | Germani ....................... | 439/441 |
| 7,491,097 | B2 | 2/2009 | Ishihara et al. | |
| 7,525,825 | B2 * | 4/2009 | Korich et al. .................. | 363/39 |
| 7,581,991 | B2 | 9/2009 | Korich et al. | |
| 8,052,427 | B2 * | 11/2011 | Doo et al. ........................ | 439/34 |
| 2004/0257841 | A1 | 12/2004 | Taguchi et al. | |
| 2006/0022329 | A1 | 2/2006 | Jordan | |
| 2008/0105476 | A1 * | 5/2008 | Korich et al. ................. | 180/65.2 |

(Continued)

FOREIGN PATENT DOCUMENTS

DE 10143200 A1 4/2003

OTHER PUBLICATIONS

German Office Action for German Application No. 102010003117.8 mailed Apr. 7, 2011.

*Primary Examiner* — Alexander Gilman
(74) *Attorney, Agent, or Firm* — Ingrassia Fisher & Lorenz, P.C.

(57) ABSTRACT

A connector is provided for coupling an electric motor of a vehicle to a power source. The connector comprises electrode and a connector housing receiving at least a portion of the electrode. The connector housing is configured to snap-fit into a powertrain housing of the vehicle via compliant flanges. In this way, the connector may be coupled to the vehicle powertrain housing without other fasteners.

15 Claims, 7 Drawing Sheets

(56) References Cited

U.S. PATENT DOCUMENTS

| | | |
|---|---|---|
| 2008/0252160 A1 | 10/2008 | Kavalsky et al. |
| 2009/0021971 A1 | 1/2009 | Korich et al. |
| 2009/0023305 A1 | 1/2009 | Korich et al. |
| 2009/0023306 A1 | 1/2009 | Korich et al. |
| 2009/0023342 A1 | 1/2009 | Korich et al. |
| 2010/0255686 A1* | 10/2010 | Doo et al. ............ 439/34 |

* cited by examiner

CONNECTOR FOR COUPLING AN ELECTRIC MOTOR TO A POWER SOURCE

TECHNICAL FIELD

The technical field generally relates vehicular electrical systems, and more particularly relates to a fasternerless connector assembly for coupling an electric motor to a power source for use in vehicles.

BACKGROUND

Increasingly, modern vehicles are configured to use electric motors to drive wheels. For example, a vehicle may include an alternating current (AC) motor that is coupled to an inverter. The inverter converts direct current (DC) received from a power source (e.g., a battery) into alternating current that can be used by the electric motor. In general, inverters use a combination of switches, or transistors, operated at various intervals to convert DC power into AC power. The electric motor receives the AC power via a one or more inverter output terminals.

Typically, electric motors are coupled to the inverter output terminals via a cable assembly. The cable assembly includes one or more cables (for example, three cables for a three-phase electric motor) that are coupled to the electric motor and the inverter output terminal via one or more fasteners. In addition, the cable may be secured within the vehicle engine compartment via one or more clips or brackets. Cable assemblies such as the one described above provide an effective mechanism for coupling an electric motor to an inverter output terminal However, the use of conventional cable assemblies does have certain disadvantages. For example, the cable assembly must be connected, and disconnected, each time the inverter is installed on, or removed from, the vehicle. This increases the complexity and cost of manufacturing, or repairing, the vehicle. Further, the cable assembly is subject to vibrations, heat, and other conditions within the vehicle that can damage the cable or cause it to become disconnected. Under such circumstances, it may be necessary to reconnect or replace the cable resulting in additional expense to the vehicle owner.

Accordingly, it is desirable to provide a connector assembly for coupling an electric motor to an inverter output terminal that facilitates connecting or disconnecting the cable for assembly or repair. Furthermore, other desirable features and characteristics of the present invention will become apparent from the subsequent detailed description and the appended claims, taken in conjunction with the accompanying drawings and the foregoing technical field and background.

BRIEF SUMMARY

In accordance with exemplary embodiments, a connector is provided for coupling an electric motor of a vehicle to a power source. The connector includes electrode and a connector housing receiving at least a portion of the electrode. The connector housing is configured to snap-fit into a powertrain housing of the vehicle via compliant flanges. In this way, the connector may be coupled to the vehicle powertrain housing without other fasteners.

In accordance with exemplary embodiments, a method is provided for coupling a connector between an electric motor of a vehicle and to a power source. The method includes snap-fitting a connector into a connector block configured on a powertrain housing of a vehicle. Next, electrically coupling one end of an electrode of the connector to a terminal block within the powertrain housing. Then, the other end of the electrode is connected to a first end of a cable and a second end of the cable is connector to an inverter of the vehicle to provide power to the electric motor.

DESCRIPTION OF THE DRAWINGS

The subject matter will hereinafter be described in conjunction with the following drawing figures, wherein like numerals denote like elements, and.

DETAILED DESCRIPTION

The following detailed description is merely exemplary in nature and is not intended to limit the subject matter of the disclosure or its uses. Furthermore, there is no intention to be bound by any expressed or implied theory presented in the preceding technical field, background, brief summary or the following detailed description.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language.

Additionally, the following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that, although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

Finally, for the sake of brevity, conventional techniques and components related to vehicle electrical and mechanical parts and other functional aspects of the system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention. It should also be understood that FIGS. 1-6 are merely illustrative and may not be drawn to scale.

Figure 1:
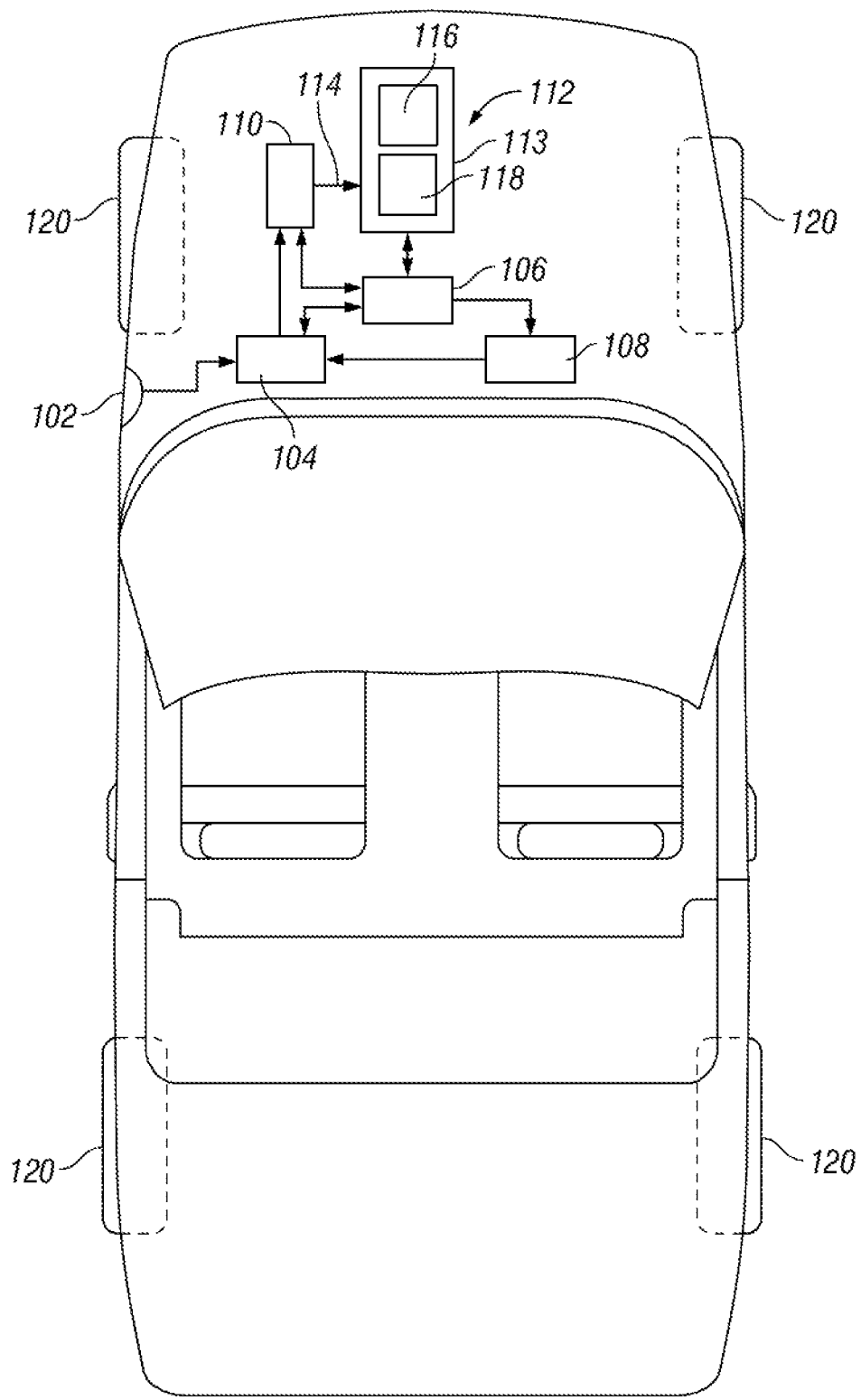
FIG. 1 is an illustration of a vehicle suitable for using exemplary embodiments of the present disclosure.

FIG. 1 is a simplified schematic representation of an embodiment of a vehicle 100 suitable for use with exemplary embodiments of the present disclosure. Although the vehicle 100 is illustrated as a purely electric vehicle, the techniques and concepts described herein are also applicable to hybrid electric vehicles. The vehicle 100 may be any one of a number of different types of vehicles, such as, for example, a sedan, a wagon, a truck, or a sport utility vehicle (SUV), and may be two-wheel drive (2WD), four-wheel drive (4WD), or all-wheel drive (AWD). In hybrid electric vehicle embodiments, the vehicle 100 may also incorporate any one of, or combination of, a number of different types of engines, such as, for example, a gasoline or diesel fueled combustion engine, a flex fuel vehicle (FFV) engine (i.e., using a mixture of gasoline and alcohol), a gaseous compound (e.g., hydrogen and/or natural gas) fueled engine in addition to an electric motor.

The illustrated embodiment of the electric vehicle 100 includes, without limitation: a plug-in charging port 102 coupled to an energy storage system 104; a control module 106 coupled to a generator 108 for charging the energy storage system 104; and an inverter 110 coupled to the energy storage system 104 for providing AC power to a powertrain 112 via a cable 114. The powertrain 112 includes an electric motor 116 and a transmission 118 for driving wheels 120 to propel the vehicle 100.

The plug-in charging port 102 may be configured as any suitable charging interface, and in one embodiment, comprises a charging receptacle compatible with the J1772 standard, which receives a charging cable with compatible plug (not shown). The energy storage system 104 may be realized as a rechargeable battery pack having a single battery module or any number of individual battery cells operatively interconnected (e.g., in series or in parallel), to supply electrical energy. A variety of battery chemistries may be employed within the energy storage system 104 such as, lead-acid, lithium-ion, nickel-cadmium, nickel-metal hydride, etc.

The control module 106, may include any type of processing element or vehicle controller, and may be equipped with nonvolatile memory, random access memory (RAM), discrete and analog input/output (I/O), a central processing unit, and/or communications interfaces for networking within a vehicular communications network. The control module 106 is coupled to the energy storage system 104, the generator 108, the inverter 110 and the powertrain 112 and controls the flow of electrical energy between the these modules depending on a required power command, the state of charge of the energy storage system 104, etc.

As noted above, the powertrain 112 includes an electric motor 116 and a transmission 118 configured within a powertrain housing 113. The electric motor 16 includes a rotor and stator (not shown) operatively connected via the transmission 118 to at least one of the wheels 120 to transfer torque thereto for propelling the vehicle 100. It will be appreciated that in hybrid-electric embodiments, the powertrain 112 may be implemented as a series hybrid-electric powertrain or as a parallel hybrid-electric powertrain.

Figure 2:
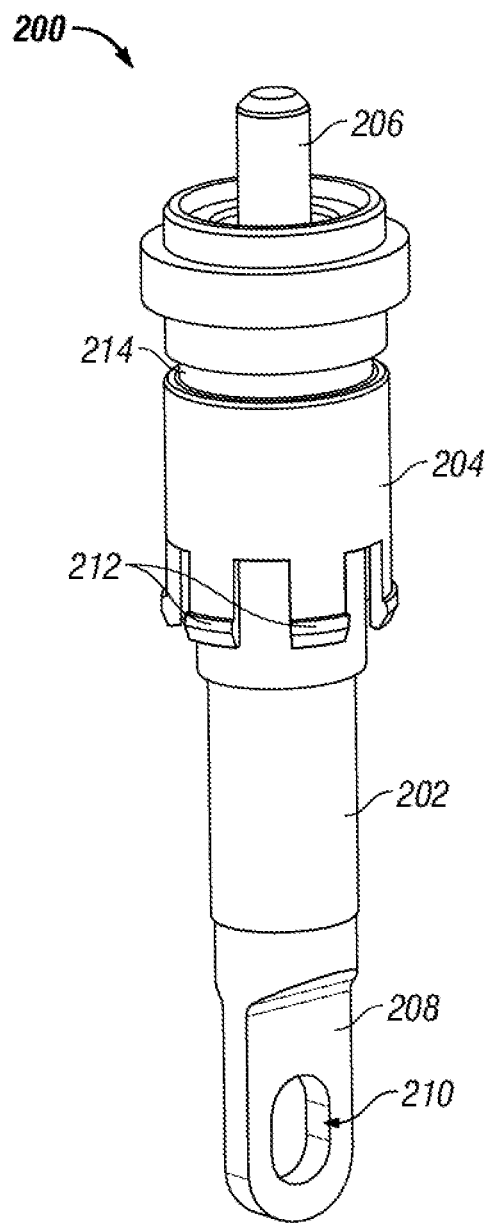
FIG. 2 is an illustration of an exemplary embodiment of a connector according to the present disclosure.

FIG. 2 is an illustration of an exemplary embodiment of a connector 200 according to the present disclosure. The connector 200 of the present disclosure is referred to as fastenerless as it is configured to snap-fit into a connector block as will described in more detail below. The connector 200 includes an electrode 202 and a connector housing 204. In some embodiments, the electrode 202 comprises nickel plated aluminum (or an aluminum alloy) that offers good electrical conductivity and corrosion resistance. In other embodiments, plated copper (or copper alloy) could be used, albeit, at a higher expense. The connector housing 204 comprises a polyphenylene sulfide plastic in some embodiments to provide superior high temperature performance and good chemical resistance. It will be appreciated, however, that other plastic or insulating materials could be used for the connector housing 204 in other embodiments.

The electrode 202 is configured with a connecting end 206 for electrically coupling to a mating connector of the cable assembly (114 in FIG. 1) providing power from the inverter (110 in FIG. 1). An opposite end of the electrode 202 is configured with a flattened portion 208 having a hole 210 formed therein for providing electrical coupling to a terminal block (not shown in FIG. 2) within the powertrain housing (113 in FIG. 1).

The connector housing 204 is provided with a plurality (four shown about the periphery in the illustrated embodiment) of compliant flanges 212. The compliant flanges 212 provide the snap-fit connection to a connector block (not shown in FIG. 2) located on the powertrain housing (113 in FIG. 1). As will be appreciated and further explained below, as the compliant flanges 212 are pressed (by hand or robotic operation) into the connector block, the complaint flanges 212 flex or deform slightly and then return (snap back) to the pre-assembly position thereby locking the connector 200 into place. Also included on the connector housing 204 is a groove 214 for receiving an O-ring (not shown in FIG. 2) that will provide a seal between the connector 200 and connector block when assembled. Additionally, O-rings (not shown in FIG. 2) may be employed between the electrode 202 and the connector housing 204 to provide a friction fit therebetween.

Figure 3:
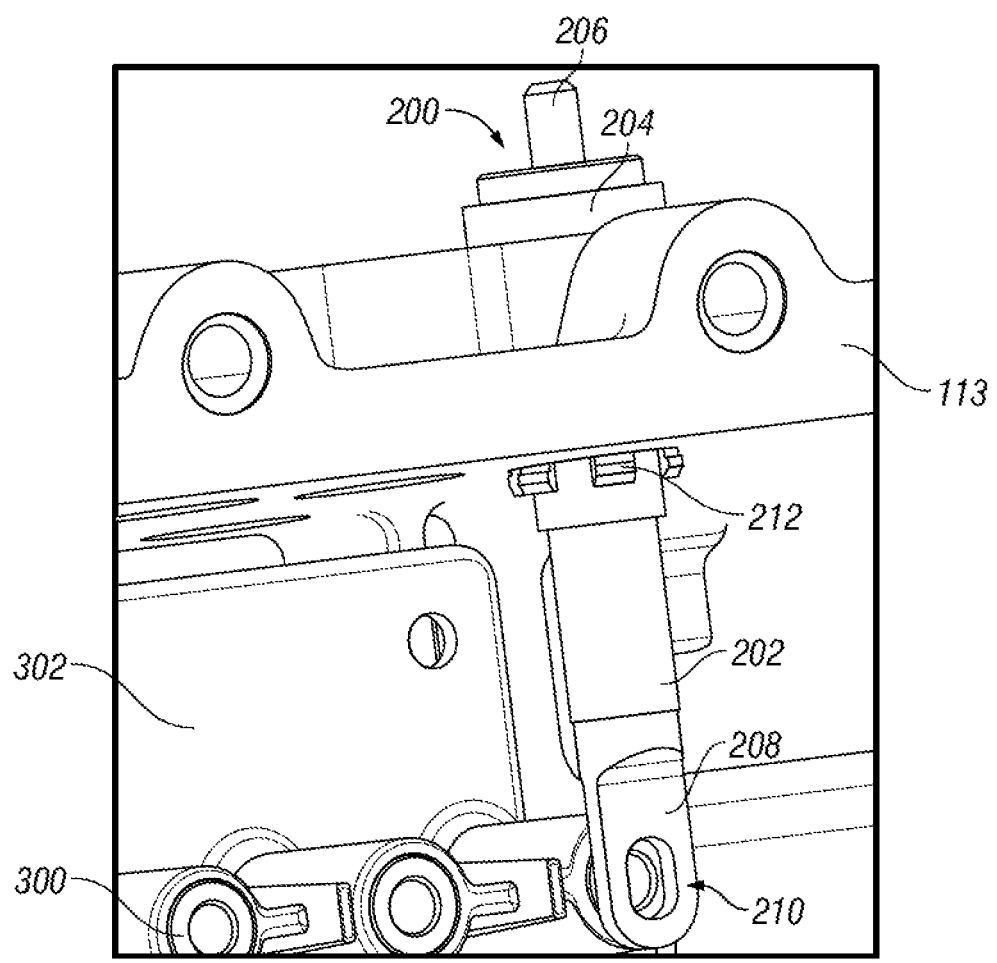
FIG. 3 is a cross-sectional illustration of the connector of FIG. 2 installed in a connector block of a powertrain housing of the vehicle of FIG. 1 without requiring fasteners.
Figure 4:
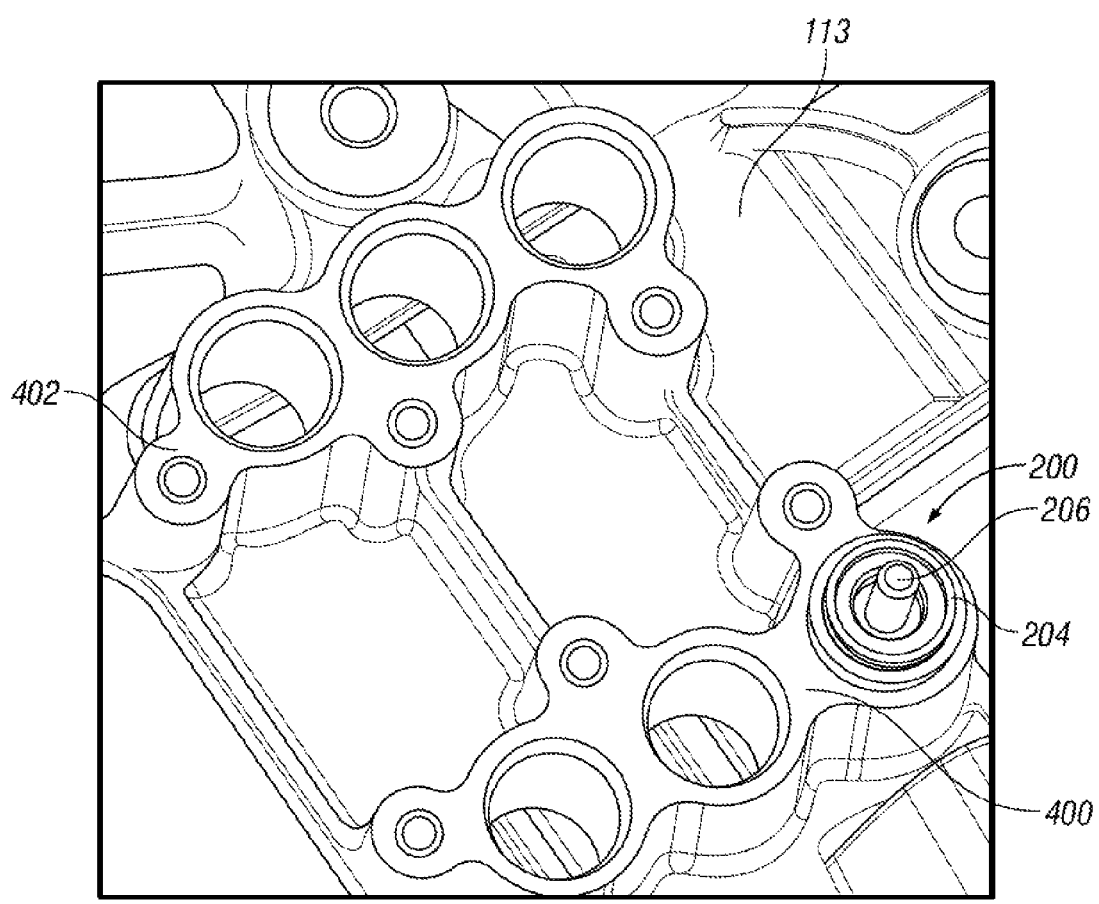
FIG. 4 is a top plan view illustration of the connector of FIG. 2 installed in a connector block of a powertrain housing of the vehicle of FIG. 1.

Referring now to FIGS. 3 and 4, wherein like reference numbers refer to like components, the connector 200 is illustrated post installation into a connector block (400 in FIG. 4) that is positioned on the powertrain housing 113. Typically, the connector block 400 receives a connector 200 for each phase of a multi-phase (e.g., three-phase) electric motor (116 in FIG. 1). In some embodiments, the connector block 400 is positioned over the portion of the powertrain housing 113 containing the transmission (118 in FIG. 1): That is, the transmission housing. Other locations on the powertrain housing 113 are, of course, possible. In FIG. 3, the compliant flanges 212 can be seen to have locked the connector 200 into place in the connector block 400 without any other fasteners being required. The flattened portion 208 is illustrated with the hole 210 aligned with terminal (three shown, for example one each for a three-phase electric motor) 300 of a terminal block 302 within the powertrain housing 113. A conductive fastener (not shown in FIG. 3) electrically couples the terminal 300 to the electrode 202 of the connector 200 to receive power provided by a cable assembly (not shown in FIG. 3) that connects to the connecting end 206 of the electrode 202. Also shown in FIG. 4 is another connector block 402 that will receive connectors 200 for establishing a return path to complete an electrical circuit between the terminal block 302 and the inverter (110 in FIG. 1).

Figure 5:
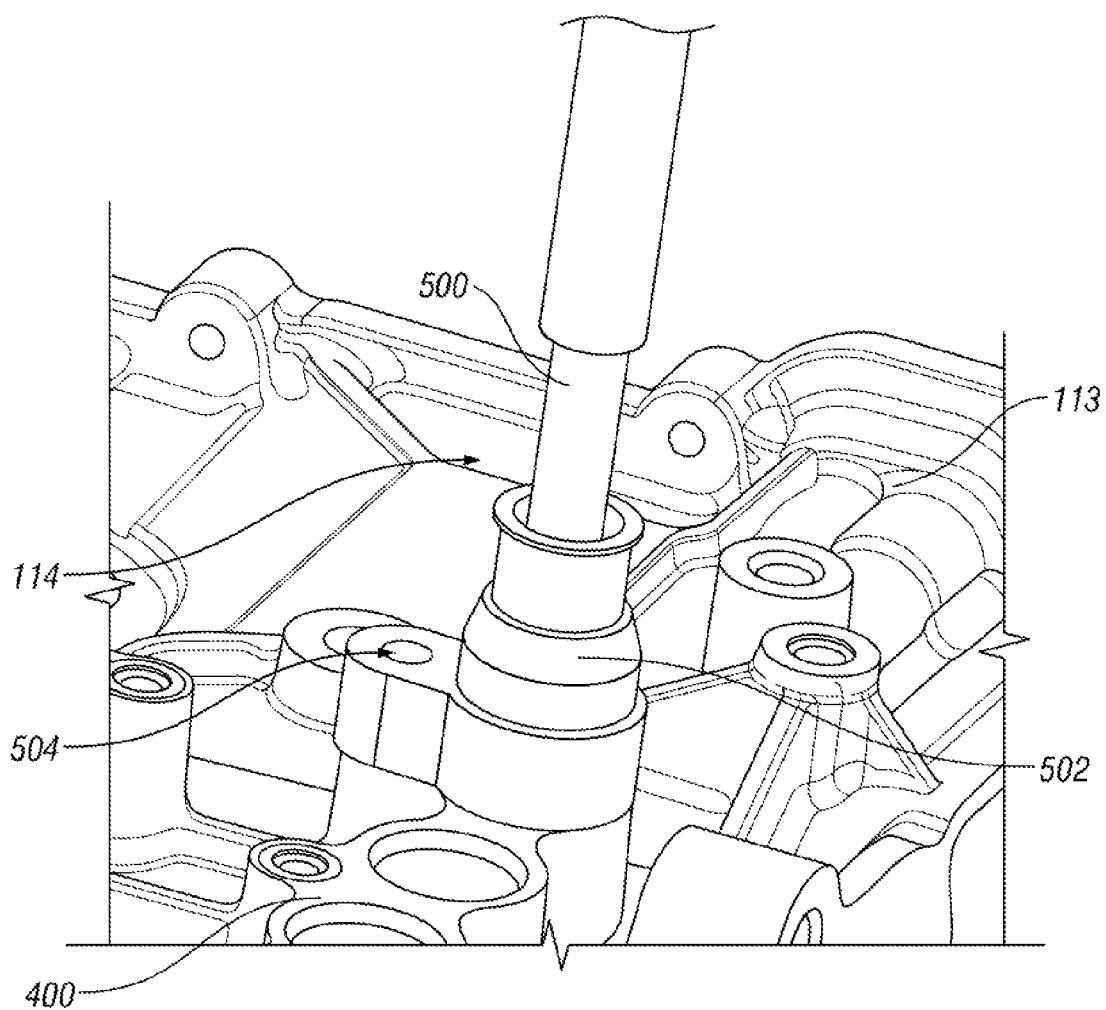
FIG. 5 is a top plan view illustration of a cable assembly coupled to the connector of FIG. 4.

Referring now to FIGS. 4 and 5, wherein like reference numbers refer to like components, the installed (see FIG. 4) connector 200 is illustrated in FIG. 5 as receiving a cable of the cable assembly 114 from the inverter (110 in FIG. 1). For ease of illustration and understanding, a braided shield and outer cable jacket of the cable is not shown. The illustrated portion of the cable assembly 114 includes a conductor 500 that terminates in a mating connector (not shown in FIG. 5) for the connecting portion 206 of the electrode 202 within a cable housing 502. The cable housing is preferably made of a conductive (e.g., metal) material. The cable housing 502 includes a mounting area having a hole 504 for receiving a fastener (not shown in FIG. 5) that insure physical coupling as well as electrical coupling to the powertrain housing 113. The electrical coupling between the cable housing 502 and the powertrain housing 113 provides electromagnetic interference protection by providing a reference (i.e., ground) potential from the powertrain housing 113 to the cable housing 502 (and thus the braided shield of the cable assembly 114).

Figure 6:
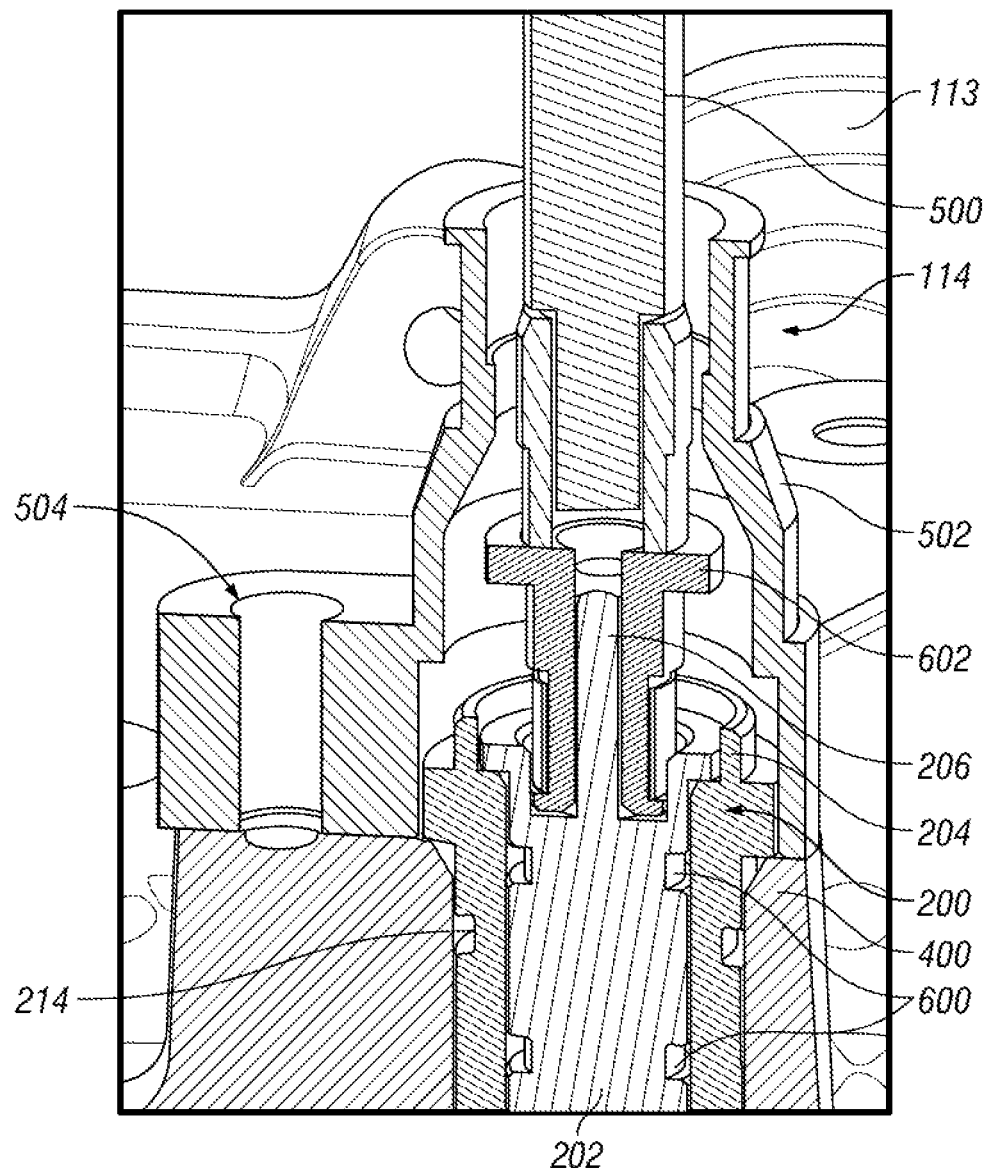
FIG. 6 is a cross-sectional illustration of FIG. 5.

FIG. 6 is a cross-sectional illustration of FIG. 5 wherein like reference numbers refer to like components. The connector 200 is illustrated seated (via snap-fit coupling) in the connector block 400 and held in position by the connector housing 204. Within the connector housing 204, grooves 600 can be seen for receiving O-rings between the connector housing 204 and the electrode 202. Additionally, the groove 214 for receiving an O-ring positioned between the connector housing 204 and the connector block 400 is shown. The connecting portion 206 of the electrode 202 is illustrated coupled to a mating connector 602 within the cable housing 502, which in turn is coupled to the conductor 500. The connecting members 206 and 602 are simply pressed together and a fastener (not shown) is secured through the hole 504 in the cable housing 502 to maintain the connection and electrical circuit between the terminal block (302 in FIG. 3) and the inverter (110 in FIG. 1). Accordingly, should the cable assembly 114 fail, it can be removed from the connector 200 by removing a single fastener (per cable) and un-plugging the cable. Conversely, if the connector should fail, it can be removed by removing the cable and one fastener from the terminal block (see FIG. 3) and un-snapping the connector 200 from the connector block (400 in FIG. 4).

Figure 7:
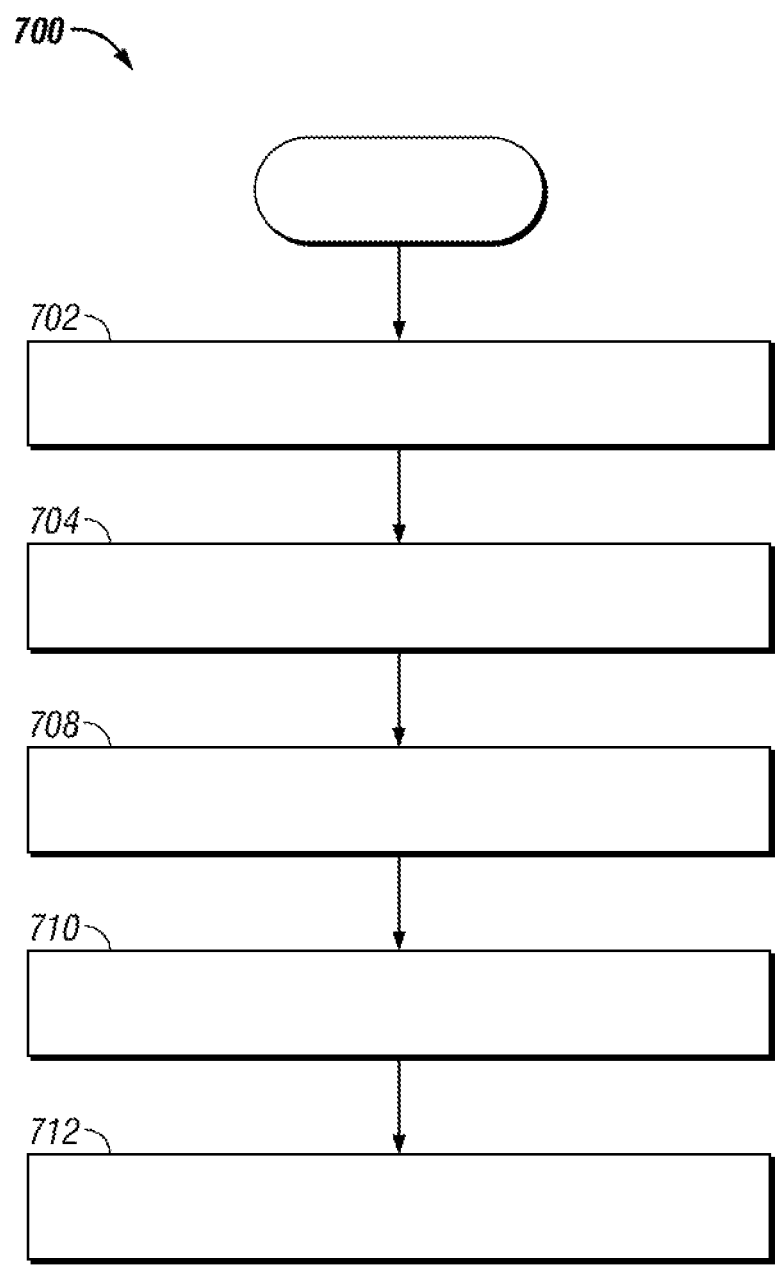
FIG. 7 is a flow diagram reciting the steps for fastenerless assembly of the connector of FIG. 2 into the powertrain housing of the vehicle of FIG. 1.

Referring now to FIG. 7, a flow diagram of a method 700 for assembly of the connector 200 within the vehicle (100 in FIG. 1) is shown. For illustrative purposes, the following description of the method of FIG. 7 may refer to elements mentioned above in connection with FIGS. 1-6. It should also be appreciated that the method of FIG. 7 may include any number of additional or alternative tasks and that the method of FIG. 7 may be incorporated into a more comprehensive procedure or process having additional functionality not described in detail herein. Moreover, one or more of the tasks shown in FIG. 7 could be performed in a different order than that shown as long as the intended overall functionality remains intact.

The method 700 begins in step 702 where the connector (200 in FIG. 2) is snap-fit into a connector block (400 in FIG. 4). In step 704, the electrode 202 of the connector 200 is electrically coupled to a terminal (300 in FIG. 3) of a terminal block (302 in FIG. 3) within the powertrain housing (113 in FIG. 1). Next, in step 706, a cable of a cable assembly (114 in FIG. 5) is coupled to a connecting portion 206 of the electrode 202 via a mating connector (602 in FIG. 6) within a cable housing (502 in FIG. 5). In step 708, a fastener is used to electrically couple the cable housing to the powertrain housing (113 in FIG. 5) via a hole (504 in FIG. 5) provided in the cable housing. This offers electromagnetic interference protection by providing a reference (e.g., ground) potential for the cable assembly (113 in FIG. 5). The above steps are repeated in step 710 for the remaining cables of the cable assembly (e.g., one cable per phase of the electric motor). Finally, the other end of the cable assembly is connected (step 712) to the inverter (110 in FIG. 1) so the electric motor can be powered to propel the vehicle (100 in FIG. 1).

Accordingly, a connector is provided to supply AC power from an inverter to a vehicle. The connector of the present disclosure requires no fasteners to install the connector in a connector block, and only single fasteners to complete electrical connections to a cable and a terminal block. This simplifies and facilitates assembly and repair of the vehicle as compared to conventional cable assemblies employed in contemporary vehicles.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing summary and detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A connector, comprising:
   an electrode having a first end configured with a flattened portion having a hole formed therein for fastening to a terminal block within a vehicle powertrain housing and a second end configured to receive a mating end of a cable coupled to an inverter; and
   a connector housing receiving at least a portion of the electrode and configured to snap-fit into a one of a plurality of connector openings in a connector block of a vehicle powertrain housing via compliant flanges positioned on the connector housing;
   wherein, the connector may be coupled to the vehicle powertrain housing without other fasteners and wherein the inverter is coupled to the terminal block within the vehicle powertrain housing.

2. The connector of claim 1, wherein the electrode comprises aluminum or an aluminum alloy with nickel plating.

3. The connector of claim 1, wherein the mating end of the cable includes a housing having a hole formed therein for receiving a fastener to electrically couple the housing to the connector block of the vehicle powertrain housing providing electromagnetic interference protection to the interface between the connector and the mating end of the cable.

4. The connector of claim 1, wherein the electrode comprises copper or a copper alloy.

5. The connector of claim 1, wherein the connector housing comprises a polyphenylene sulfide plastic.

6. The connector of claim 1, wherein the connector housing includes a groove configured to receive an o-ring.

7. A connector, comprising:
   an electrode having a first end configured to receive a mating end of a cable from an inverter and a second end configured with a flattened portion having a hole formed therein for fastening for electrically connecting to a terminal block of a vehicle powertrain; and
   a connector housing receiving at least a portion of the electrode and having compliant flanges positioned on the connector housing and configured to deform slightly when pressed into one of a plurality of connector openings in a connector block of a vehicle powertrain housing and snap back to form a snap-fit connection with the connector block of the powertrain housing;
   wherein, the connector may be coupled to the vehicle powertrain housing without other fasteners and wherein the inverter is coupled to the terminal block within the vehicle powertrain housing.

8. The connector of claim 7, wherein the electrode comprises aluminum or an aluminum alloy with nickel plating.

9. The connector of claim 7, wherein the electrode comprises copper or a copper alloy.

10. The connector of claim 7, wherein the connector housing comprises a polyphenylene sulfide plastic.

11. The connector of claim 7, wherein the connector housing includes a groove configured to receive an o-ring.

12. The connector of claim 7, wherein the mating end of the cable includes a housing having a hole formed therein for receiving a fastener to electrically couple the housing to the connector block of the vehicle powertrain housing providing electromagnetic interference protection to the interface between the connector and the mating end of the cable.

13. The connector of claim 7, wherein the flattened portion of the second end of the electrode has a hole formed therein for fastening to a the terminal block within the vehicle powertrain housing.

14. A connector, comprising:
an electrode having a first end configured to receive a mating end of a cable from an inverter and a second end having a flattened portion with a hole formed therein for fastening to a terminal block within a vehicle powertrain housing thereby forming an electrically connection to the terminal block the electrode also having a groove configured to receive an o-ring for forming a seal between the electrode and connector housing; and a the connector housing being configured to receive at least a portion of the electrode and having compliant flanges positioned on the connector housing and configured to deform slightly when pressed into one of a plurality of connector openings in a connector block of the vehicle powertrain housing and snap back to form a snap-fit connection with the connector block of powertrain housing, the connector housing also having a groove configured to receive an o-ring for forming a seal between the connector and the powertrain housing;

wherein, the connector may be coupled to the vehicle powertrain housing without other fasteners and wherein the inverter is coupled to the terminal block within the vehicle powertrain housing.

15. The connector of claim 14, wherein the mating end of the cable includes a housing having a hole formed therein for receiving a fastener to electrically couple the housing to the connector block of the vehicle powertrain housing providing electromagnetic interference protection to the interface between the connector and the mating end of the cable.

* * * * *